United States Patent
Nestler

(10) Patent No.: US 10,280,377 B1
(45) Date of Patent: May 7, 2019

(54) PYROLYSIS AND STEAM CRACKING SYSTEM

(71) Applicant: Helge Carl Nestler, Chattanooga, TN (US)

(72) Inventor: Helge Carl Nestler, Chattanooga, TN (US)

( * ) Notice: Subject to any disclaimer, the term of this patent is extended or adjusted under 35 U.S.C. 154(b) by 137 days.

(21) Appl. No.: 15/461,637

(22) Filed: Mar. 17, 2017

Related U.S. Application Data

(60) Provisional application No. 62/312,785, filed on Mar. 24, 2016.

(51) Int. Cl.
| | |
|---|---|
| C10B 53/02 | (2006.01) |
| C10J 3/66 | (2006.01) |
| C10B 5/00 | (2006.01) |
| C10B 7/10 | (2006.01) |
| C10B 47/44 | (2006.01) |

(52) U.S. Cl.
CPC ............... *C10J 3/66* (2013.01); *C10B 5/00* (2013.01); *C10B 7/10* (2013.01); *C10B 47/44* (2013.01); *C10B 53/02* (2013.01); *C10J 2300/0916* (2013.01); *C10J 2300/0946* (2013.01); *C10J 2300/0959* (2013.01); *C10J 2300/0976* (2013.01); *C10J 2300/12* (2013.01); *C10J 2300/165* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 2,075,101 | A | * | 3/1937 | Dreyfus ................. | C10G 1/086 208/419 |
| 3,658,654 | A | * | 4/1972 | Gutberlet ................. | C10B 7/10 201/29 |
| 3,997,689 | A | * | 12/1976 | Hervert ..................... | B01J 8/382 252/502 |
| 4,056,461 | A | * | 11/1977 | Unverferth ............. | C10B 49/16 201/12 |
| 4,069,133 | A | * | 1/1978 | Unverferth .............. | C10G 1/02 201/4 |
| 4,084,521 | A | * | 4/1978 | Herbold ................. | B29B 17/04 110/242 |
| 4,308,034 | A | * | 12/1981 | Hoang ..................... | C10J 3/002 110/229 |
| 4,316,873 | A | * | 2/1982 | Koch ....................... | C10G 1/06 422/112 |
| 4,345,988 | A | * | 8/1982 | Koch ......................... | B01J 3/03 208/401 |
| 4,347,119 | A | * | 8/1982 | Thomas .................... | C10B 7/00 201/15 |

(Continued)

*Primary Examiner* — Kaity V Chandler
(74) *Attorney, Agent, or Firm* — Stephen J. Stark; Miller & Martin PLLC

(57) ABSTRACT

A syngas generator provides a pyrolysis chamber and a steam cracking unit within a heater. A conveyor such as an auger directs input through the pyrolysis chamber where a pyrolysis reaction at about 600 C releases a gas/vapor mixture which is directed through a manifold and through an ejector into the cracking unit which operates at about 1200 C. Syngas from the cracking unit can be cooled, used for co-generation power systems, generate steam, and/or be burned (possibly combusted to generate electricity) with the heat used to heat the heater.

20 Claims, 8 Drawing Sheets

(56) References Cited

U.S. PATENT DOCUMENTS

| | | | | |
|---|---|---|---|---|
| 4,571,249 A * | 2/1986 | Bonasso | C10J 3/62 | 48/63 |
| 4,983,278 A * | 1/1991 | Cha | C10B 47/44 | 208/407 |
| 5,084,141 A * | 1/1992 | Holland | B01J 19/126 | 201/19 |
| 5,709,779 A * | 1/1998 | May | C10B 1/10 | 202/100 |
| 5,711,235 A * | 1/1998 | May | C10B 1/10 | 110/255 |
| 6,011,187 A * | 1/2000 | Horizoe | B29B 17/02 | 201/2.5 |
| 6,178,899 B1 * | 1/2001 | Kaneko | B01D 53/34 | 110/204 |
| 6,398,921 B1 * | 6/2002 | Moraski | C02F 1/302 | 110/346 |
| 6,660,680 B1 * | 12/2003 | Hampden-Smith | B01J 2/003 | 257/E21.304 |
| 9,045,693 B2 * | 6/2015 | Wolfe | C10J 3/007 | |
| 9,052,109 B1 * | 6/2015 | Fowler | C10B 47/44 | |
| 9,446,975 B2 * | 9/2016 | Nickerson | C10J 3/007 | |
| 9,505,984 B2 * | 11/2016 | Mulqueen | C05D 9/00 | |
| 9,561,957 B2 * | 2/2017 | Hammel | B01J 23/882 | |
| 2006/0076224 A1 * | 4/2006 | Ku | C10B 47/44 | 202/99 |
| 2007/0251433 A1 * | 11/2007 | Rabiner | B09B 3/00 | 110/235 |
| 2008/0128259 A1 * | 6/2008 | Kostek | B01D 5/0006 | 201/4 |
| 2008/0223268 A1 * | 9/2008 | Gehring | F23G 5/027 | 110/336 |
| 2010/0154728 A1 * | 6/2010 | Kemper | C10B 19/00 | 123/3 |
| 2010/0288618 A1 * | 11/2010 | Feerer | C10B 47/44 | 202/118 |
| 2010/0319255 A1 * | 12/2010 | Struble | C10J 3/62 | 48/62 R |
| 2011/0048915 A1 * | 3/2011 | Gaga | C02F 11/10 | 201/2.5 |
| 2011/0114144 A1 * | 5/2011 | Green | C05D 9/00 | 136/201 |
| 2011/0136971 A1 * | 6/2011 | Tucker | B82Y 30/00 | 524/587 |
| 2011/0315539 A1 * | 12/2011 | Zadik | C05F 7/00 | 202/99 |
| 2012/0073199 A1 * | 3/2012 | Lewis | C10B 53/02 | 48/127.5 |
| 2012/0145051 A1 * | 6/2012 | Sweeney | F23G 5/027 | 110/224 |
| 2012/0168297 A1 * | 7/2012 | Burnett | C10B 47/32 | 201/35 |
| 2012/0217150 A1 * | 8/2012 | Kostek, Sr. | B01D 5/0006 | 202/108 |
| 2012/0308441 A1 * | 12/2012 | Hansen | C10B 47/44 | 422/187 |
| 2013/0004409 A1 * | 1/2013 | Tucker | C10B 47/30 | 423/445 R |
| 2013/0312472 A1 * | 11/2013 | Brehmer | B01J 20/20 | 71/24 |
| 2013/0327626 A1 * | 12/2013 | Daugaard | C10G 1/02 | 201/2.5 |
| 2013/0327627 A1 * | 12/2013 | Daugaard | C10G 3/42 | 201/2.5 |
| 2014/0073822 A1 * | 3/2014 | Wei | C10G 1/02 | 585/16 |
| 2014/0301934 A1 * | 10/2014 | Tucker | C10B 47/30 | 423/447.2 |
| 2015/0071836 A1 * | 3/2015 | Gorke | C10J 3/82 | 422/634 |
| 2016/0326439 A1 * | 11/2016 | Vanttinen | C10B 47/44 | |

* cited by examiner

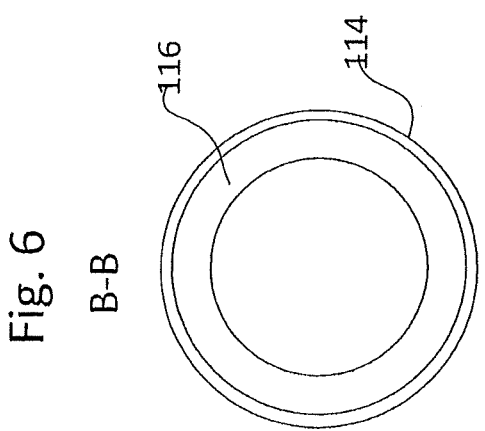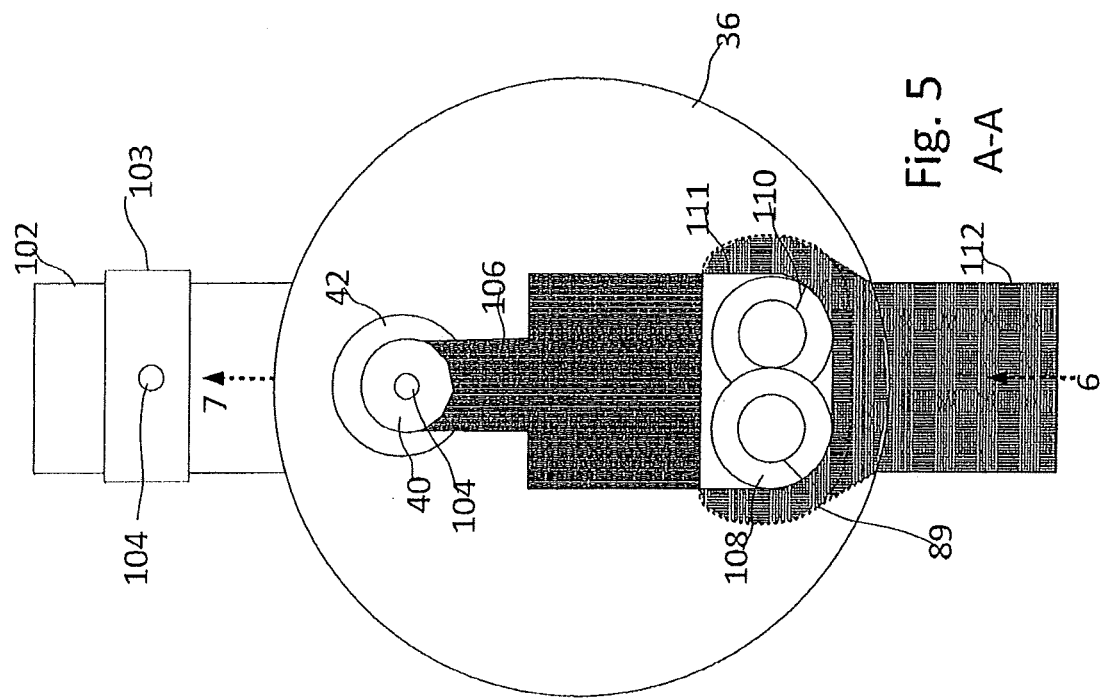

PYROLYSIS AND STEAM CRACKING SYSTEM

CLAIM OF PRIORITY

This application claims the benefit of U.S. Provisional Application No. 62/312,785 filed Mar. 24, 2016, which is incorporated herein by its reference in its entirety.

FIELD OF THE INVENTION

The object of this present invention is to provide a system to convert organic material contained in waste or biomass or other organic materials into energy. More specifically, the present invention relates to a device and/or system adapted to convert organic material through pyrolysis into energy, such as electricity, with a high degree of utilizing the heat generated by this process.

BACKGROUND OF THE INVENTION

The degree of the emission of $CO_2$ from the incineration of fossil fuels into our atmosphere has manifested as one major reason for the global climate change. The effects of the climate change on earth initiated a global shift in the consciousness of mankind to utilize renewable energy sources instead of fossil fuels in order to reduce our $CO_2$ emissions.

One major source of $CO_2$ emitted into the atmosphere through fossil fuels is the generation of electric power. In order to curtail the $CO_2$ emissions into our atmosphere quickly and effectively it is necessary to offer alternative electric energy generation systems utilizing renewable resources that are economically competitive compared to the systems using fossil fuels.

One way to generate electric energy through renewable resources is the conversion of biomass or other organic wastes into energy by pyrolyzation and the subsequent utilization of the pyrolysis gas through internal combustion machines or steam processes that drive generators to generate electricity. However, almost all the renewable energy sources suitable for the mentioned pyrolyzation process have in common the following: they do have a low energy density; they are locally dispersed. This creates the challenge faced to this technology to either have a centralized large pyrolysis plant where the organic material is transported to the plant from a large area; or to have decentralized small pyrolysis plants that are deployed in the area where the material is available to minimize the transportation. While the specific investment cost as well the highest degree of utilization of the energy of a pyrolysis system can be minimized by building centralized Plants with the highest possible capacity, the cost of the transportation of the feedstock increases since the material need to be sourced from farther away. Through the low energy density of the feedstock and the high transportation cost economical reasons prohibit the realization of such big centralized systems. Therefore there is a demand for smaller, decentralized pyrolysis units.

The disadvantage of these smaller pyrolysis units is the higher specific investment cost and lower energy efficiency. The challenge is to find a suitable technology for these decentralized units that is balanced between investment cost and efficiency. The pyrolysis of organic material contains many chemical reactions that produce, besides the readily utilizable gaseous products, unwanted byproducts, especially large complex hydrocarbons commonly known as soot and tars. These byproducts prohibit a direct utilization in an internal combustion machine because these byproducts cause early mechanical failure of the machine.

The prior art addresses these problems by e.g. direct combustion of the pyrolysis gas, and vapors with the subsequent utilization of the energy in a steam process. The disadvantage of a steam-only process is that a high energy efficiency of the process depends on the degree of utilization of the energy from the flue gas that needs to be transferred into the steam. To achieve this it is necessary to deploy large heat exchangers into the flue gas to generate high pressure steam that feeds multiple stage steam turbines. Therefore such systems are only economically sound when used in large-scale stationary power plants.

Another solution of the prior art is to eliminate the complex hydrocarbons during, or after the pyrolysis process by either condensing and filtering the unwanted byproducts or cracking the bonds of the large molecules with steam that is introduced into the pyrolysis reactor. The cleaned pyrolysis product is then directly used as fuel in internal combustion machines.

The prior art also addresses solutions to utilize the released heat by generating steam from the exhaust gases of the internal combustion machines. This steam then feeds a steam turbine that in turn generates electricity. This process, also commonly known as Combined Heat and Power (CHP) or Cogeneration, provides the highest degree of energy efficiency. Although CHP is very efficient, the relatively low exhaust gas temperatures released from the internal combustion machines require large and expensive heat exchangers.

All these aforementioned systems that generate and recover the energy from the pyrolysis product have in common that they are complex and need to be large to become economically feasible. But the larger the size and capacity of the aforementioned systems, the larger the radius of the area in which the organic material is gathered, grows. This increases the cost of transportation and makes such projects only in limited areas economically sound.

There is a need in the prior art for a system that provides all of the benefits of a mobile biomass pyrolyzation system with a high energy utilization rate and low specific investment cost.

BRIEF SUMMARY OF THE INVENTION

In view of the foregoing disadvantages inherent in the known types of pyrolysis Units for the disintegration and gasification of organic matter and the subsequent utilization of the pyrolysis gaseous and liquid products for the generation of energy or as a feedstock for creating chemical compounds now present in the prior art, the present invention provides a compact process unit for the disintegration and gasification of organic feedstock that directly generates electric energy from the product and recovers the generated waste heat directly to sustain the pyrolysis process.

BRIEF DESCRIPTION OF THE DRAWINGS

The accompanying drawings illustrate the preferred embodiments of the invention and, together with the description, serve to explain the invention. These drawings are offered by way of illustration and not by way of limitation.

FIG. 5 is a cross sectional view taken along the line A-A of FIG. 4;

FIG. 6 is a cross sectional view taken along the line B-B of FIG. 4;

DETAILED DESCRIPTION

In one aspect the pyrolysis plant 20 is small enough to be transportable by means of Trucks, but has a sufficiently large capacity to process the amount of organic or other material as educt 1 that has to be processed in a certain amount of time.

Figure 1:
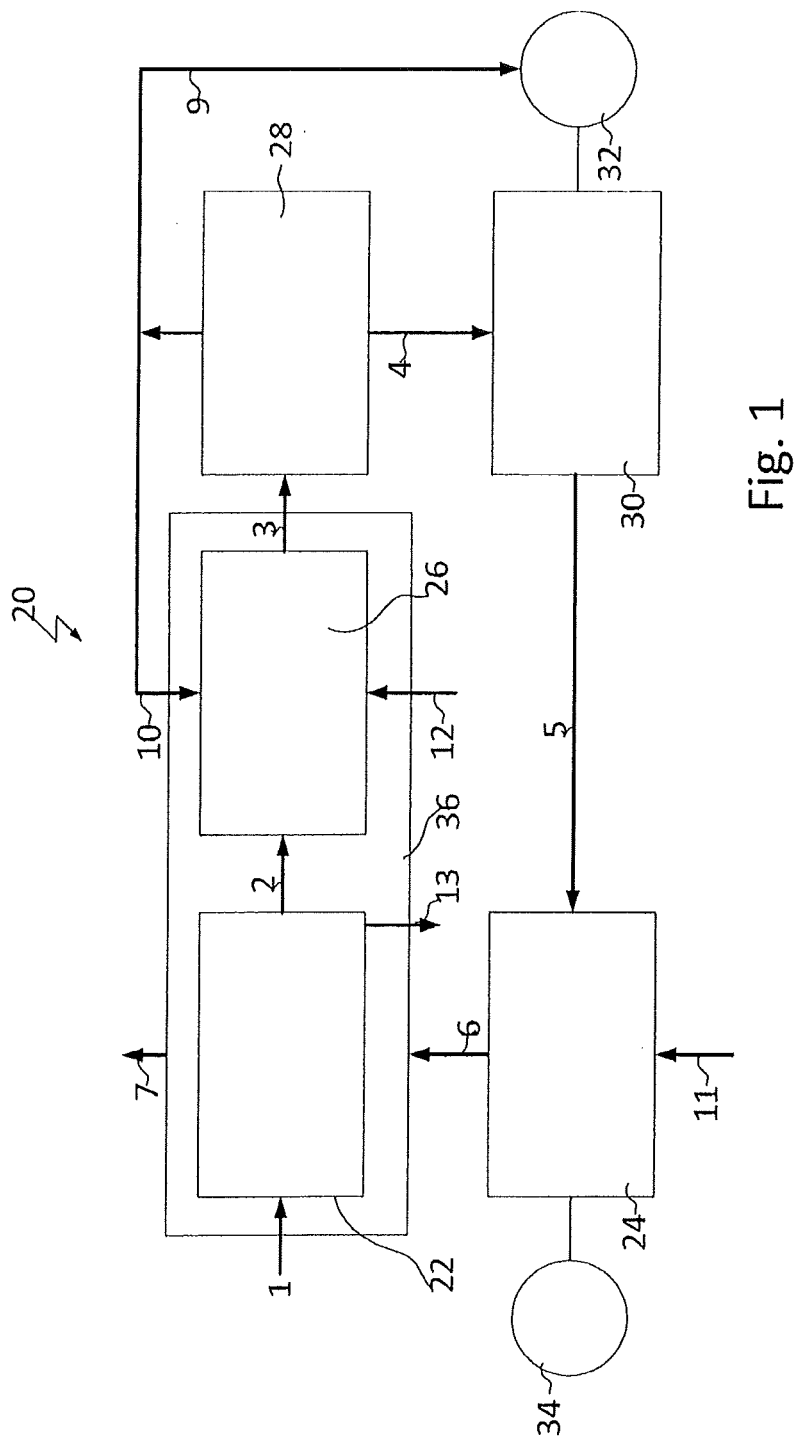
FIG. 1 is a schematic view, in accordance with some embodiments of the present invention, a Block flow diagram of the invention.

Referring now to FIG. 1 there is shown the block flow diagram of the invention. The Feedstock or Educt 1 is being disintegrated through pyrolysation in a Pyrolysis Unit 22 indirectly heated with the exhaust gases 6 of a Syngas Gas Turbine 24. The products from the pyrolysis process are typically: Char 13 and a Gas/Vapor mixture 2.

The Gas/Vapor mixture 2 is introduced into a Steam-Cracking Unit 26 where in the presence of steam 10 and air 12 the chemical bonds of the large molecules are broken up and form radicals. These radicals may react introduced steam 10 and/or any steam in the gas/vapor mixture 2 generated from the educt 1.

The hot gases leaving the Steam-Cracking Unit 26 are called Syngas 3. The Syngas 3 can be cooled down in a Syngas Cooling Waste Heat Boiler 28 that may generate steam 9 and/or 10. One part of the steam 10 may be introduced into the Steam-Cracking unit. Another portion of the steam 9 may drive a steam turbine 32. Other coolers may be used with other embodiments which may or may not generate steam.

The cooled Syngas 4 can be compressed by a Syngas Compressor 30 driven by the aforementioned steam turbine 32 or otherwise. The compressed Syngas 5 can be introduced to the Combustor of a Syngas Gas Turbine 24 where it can be mixed with compressed air 11 and incinerated. The Syngas Gas Turbine 24 may convert the incinerated, hot gases into mechanical energy that possibly drives an electrical generator 34.

The hot exhaust gases 6 of the Syngas Gas Turbine 24 exhaust are introduced into the Heating Chamber 36 where the Pyrolysis Unit and the Steam Cracking Unit are preferably located and provide heat to supplement, if not sustain the pyrolysis and cracking process. The cooled Flue Gas 7 leaving the heating chamber 36 can be released into the atmosphere over an Exhaust Gas Stack and/or other system.

Figure 2:
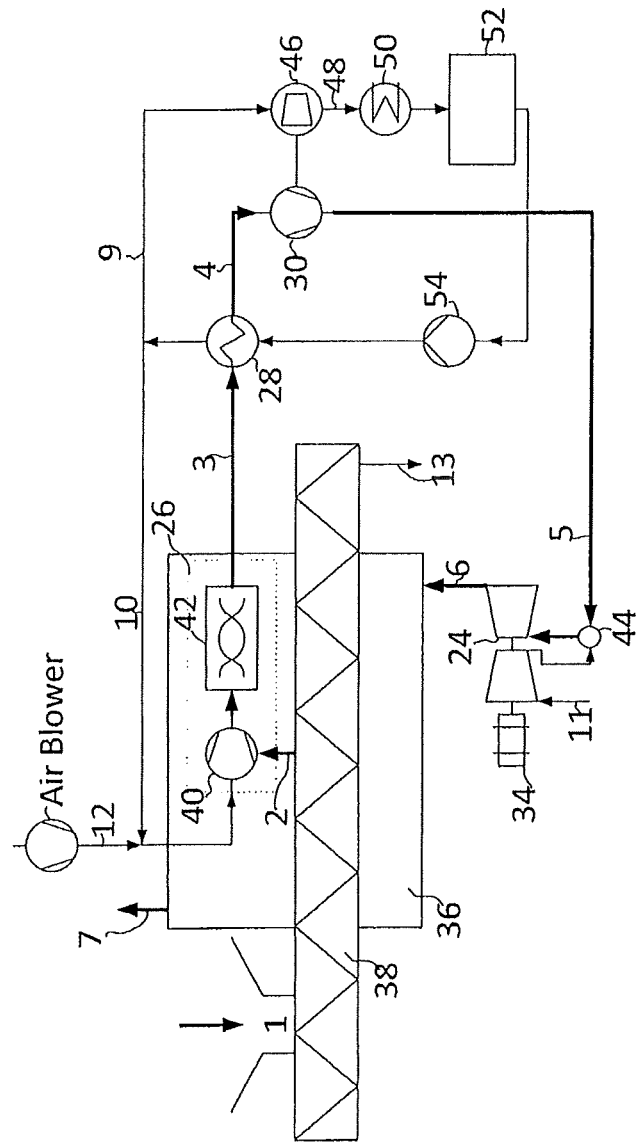
FIG. 2 is a schematic view, in accordance with some embodiments of the present invention in more detail than FIG. 1, a Process flow diagram of the invention.

Referring now to FIG. 2 with a more detailed description of the process inside the Pyrolysis Unit 22 and the Steam Cracking Unit 26:

An Auger Reactor 38 may be utilized to transport the Educt 1 through the Heating Chamber 36 while the disintegration process takes place through the elevated temperature inside the Heating Chamber 36. At the end of the Auger Reactor 38 the remaining Char 13 may be released from the Auger Reactor 38. Inside the Auger Reactor 38 the Gas/Vapor mixture 2 evaporates from the Educt 1. The Gas/Vapor mixture 2 can be pulled into an Ejector 40 preferably directly located inside the Heating Chamber 36. The Ejector 40 can be connected to a Mixing Tube 42. The Ejector 40 can be fed with air 12 and/or steam 10 that serves as a propellant and/or reactant for the subsequent cracking process with the Gas/Vapor mixture 2. The Gas/Vapor mixture 2 can mix with the air 12 and/or steam 10, which can result in a partial combustion that can increase the temperature of the mixture. The increased temperature and the presence of steam 10 opens the bonds of the large, complex hydrocarbons and the available steam 10 can attach to the open bonds (cracking process), which result in a Syngas 3.

Cracking in the cracking unit 26 is typically a relatively rapid process. At above 1000 C, such as at or above 1200 C, cracking can occur in less than about 10 secs, if not less than 5 secs.

The Syngas 3 can enter the Syngas Cooling Waste Heat Boiler 28 (or other cooler) by means of direct or indirect cooling (e.g. quench process vs. boiler/other heat exchanger) and cooled down. The cooled Syngas 4 can enter the Syngas Compressor 30 and be compressed for at least some embodiment. The compressed Syngas 5 can enter a Combustor 44 of the Syngas Gas Turbine 24 and can be mixed with compressed air and/or combusted forming a hot gas. The hot gas can expand over the Syngas Gas Turbine 24 turning the Turbine wheels and the shaft of the Turbine 24 that drives a generator 34. The expanded and hot Flue Gas 6 from the Syngas Gas Turbine 24 can exhaust to enter the Heating Chamber 36, at least assist in heating up the Auger Reactor 36 and the Steam Cracking Unit 26 and can exit though the Exhaust Gas Stack 7.

The Steam 10 produced in the Syngas Cooler Waste Heat Boiler 28 can be diverted into the Ejector 40. The Excess Steam 9 can be diverted into a Steam Turbine 46 that can directly drive the Syngas Compressor 30 for at least some embodiments.

The Steam 48 from the Steam Turbine can be condensed in a Steam Condenser 50 and passed through a Feed Water Conditioning Unit 52 to be reintroduced through the Boiler Feedwater Pump 54 into the Syngas Cooler Waste Heat Boiler for some embodiments.

Referring back to FIG. 1, the steam cycle of steam 10 generated by the Syngas Cooling Waste Boiler 28 is certainly optional for many embodiments, but if utilized it can optimize the energy efficiency of the plant 20. Steam 10 can be provided from a variety of sources. Cracking steam 10 could be generated by utilizing the available heat of the exhausts that passed through the heating chamber 36 or other location. Other cooling systems could be utilized to cool Syngas 4 to provide cooled syngas 4 to a compressor 30, to storage, and/or burning or combustion. Some compressors 30 may be driven by systems other than steam, such as electricity, or other power source, particularly if no steam cycle is provided with the Syngas cooler 28.

FIGS. 1 and 2 also show the use of a Syngas Gas Turbine 24. Other types of combustion devices and/or storage devices for the syngas 5 could be used with other embodiments, such a combustion engines, burners to directly provide heat into the heating chamber 36 and/or other devices or combination of these (e.g. combustion motor+burner, etc.).

Figure 3:
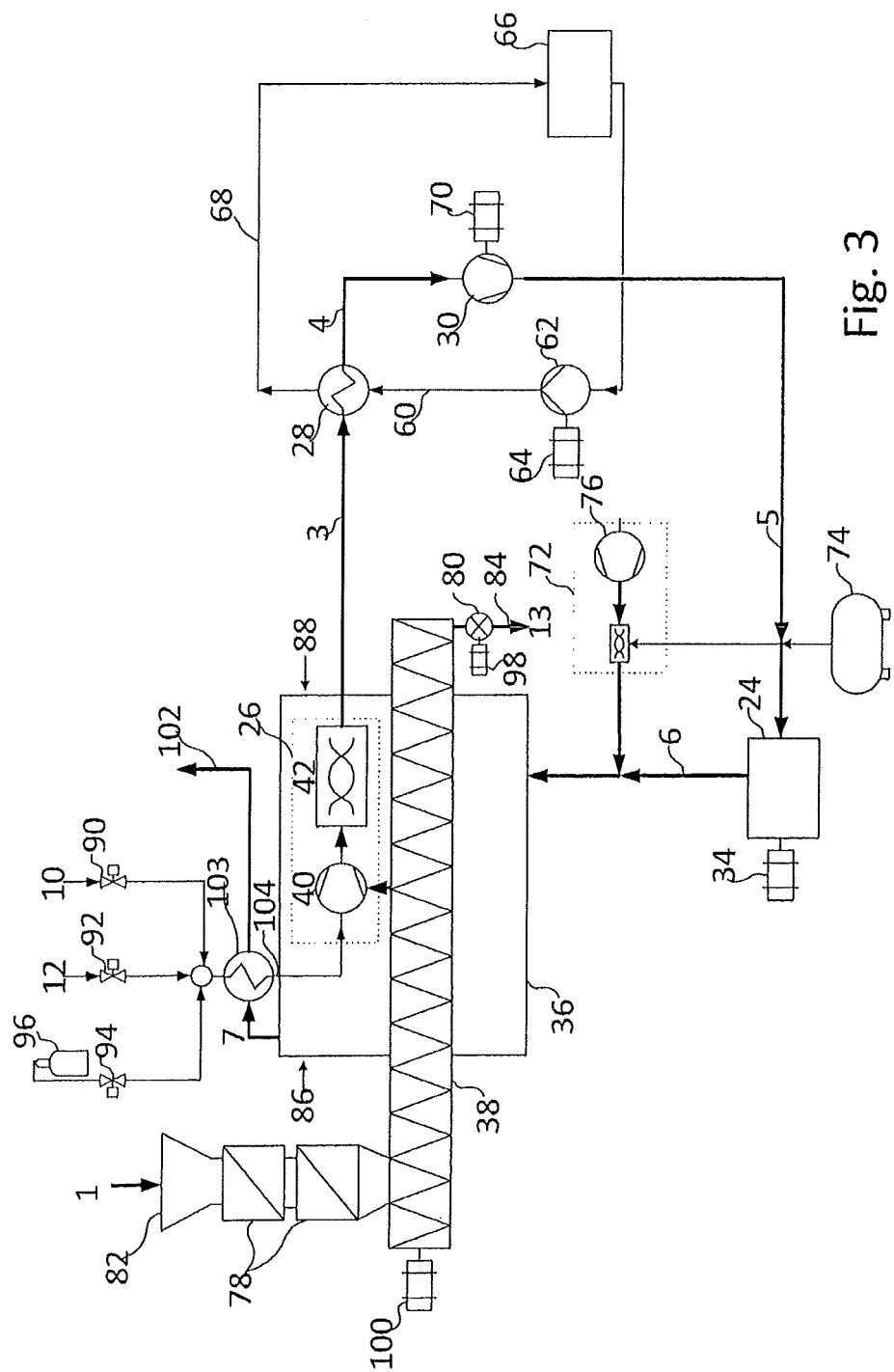
FIG. 3 is a schematic view in more detail than FIG. 2 of certain embodiments of the present invention.

FIG. 3 shows an alternatively preferred embodiment which does not use the external steam cycle shown in FIGS. 1 and 2. Instead the Syngas Cooler 28 receives coolant 60, such as from a cooling pump 62, which could be driven by an electric motor 64 or other system. A cooling tower 66 may receive heated coolant 68. Other embodiments may have still different Syngas Coolers 28. After cooling at the Syngas cooler 28, the cooled syngas 4 preferably proceeds towards a syngas compressor 30 which may be driven by an electric motor 70 or other system. Many embodiments have a syngas cooler 28 downstream of the cracking unit 26, said cooler 18 cooling syngas 3 to be cooled syngas 4 to a temperature less than 900 C within thirty seconds of the syngas 3 leaving the cracking unit 26. Allowing to stay above 900 C especially in syngas atmospheres where halogens such as Chlorine are present can lead to recombination of molecules to form dioxine which can have harmful results for at least some embodiments. In fact, reducing the temperature further and/or faster such as to less than 600 C in 30 secs, or less than 300 C in 30 secs has been found desirable. Additionally, reducing to less than 900 C in less than 15 secs, less than 10 secs and less than 5, if not about 2 secs has been found desirable. Similarly reducing to less than 600 C or 300 C in these time periods could be achieved as well for at least some embodiments.

Meanwhile, since the syngas cooler 28 is not used to generate steam 10 in this embodiment, steam 10 is provided either as steam 10 or water into the heating chamber 36 (to become steam 10), if steam 10 is not able to be found in sufficient quantity in the processed educt 1 through the pyrolysis process. Processor controlled Valve 90 may be useful to regulate flow towards the ejector 40 or at least some embodiments. Combustion air 12 may be provided either as air and/or oxygen to the steam cracking unit 40 as well, possibly being regulated by a processor controlled valve 92 from internal or external to the heating chamber 36. Another processor controlled valve 94 may be useful to selectively dispense fuel 96 into the steam cracking unit such as gas or other fuel possibly in an effort to initially heat the steam cracking unit 40 to an elevated temperature relative to the pyrolysis unit 22.

Compressed syngas 5 can be directed to a burner 72, possibly with stored gas 74, whether propane, natural gas, or other fuel, which could be further assisted with a blower 76 to provide at least some, if not all of the heat into the heating chamber 36. For many embodiments, compressed syngas 5 is burned in a combustion motor, such as turbine 24 or other motor, and exhaust or flue gas 6 from that motor is directed into the heating chamber 36. Motor provides rotational energy to generator 34 for many embodiments. Stored gas 74 could be provided independently of syngas to the burner 72 either to assist in heating the heating chamber 36 for some embodiments as well.

Pyrolysis normally occurs at a vacuum pressure relative to ambient pressure (normally 14.7 psia), so something less than 14.7 psia. Accordingly, inlet airlock(s) illustrated as double flap airlock 78 and outlet airlock 80 (such as rotary airlock or other airlock) can provide pressure barriers relative to a conveyor, illustrated as an auger reactor which could have an auger, a double auger, or other structure utilized to transport educt 1 from an inlet illustrated as a feed hopper 82 to an outlet 84 where char 13 could be directed. Motor 98 may assist in operating one or more airlocks such as airlock 80.

Material input as educt 1 can be transported from through at or towards a first end 86 of the heating chamber 36 to through or towards second end 88 of the heating chamber 36 through housing 111. Many embodiments envision principally linear transportation during the pyrolysis process. In the embodiment of FIG. 3, the reactor 38 is the Pyrolysis unit 22. Larger chain, together with smaller chain gasses proceed towards the ejector 40 and/or other portion of the steam cracking unit 26 which may function as described above. Motor 100 may assist in operating the conveyor illustrated as auger reactor 38.

Pyrolysis in the pyrolysis unit 22 is allothermal (heating in the absence of oxygen) and typically at a vacuum pressure. Volatiles 2 are extracted, possibly with steam or other off gasses. Char 13 is removed. Volatiles can be fed into the cracking unit 26 such as with ejector 40 or other mechanism. An ejector can use air or oxygen input 104 and/or steam 10 as a driving mechanism to assist in pulling the volatiles 2 into the mixing tube or chamber 42 where the cracking process can occur. Desired cracking temperature is often in a range of 1000-1200 C. The amount of air/oxygen to sustain the cracking temperature can be controlled with one or more of the valves 90,92,94, etc. Volatiles 2 can be maintained at a sufficiently high temperature to crack high chained molecules quickly. This can reduce a size of the heating chamber 36 signifienatly. Syngas 3 is preferably rapidly cooled with cooler 28 to prevent recombination of chemical bonds.

Burned syngas whether from burner 72 or exhaust or flue gas 6 can be directed into the heating chamber, possibly along with other heaters to heat the heating chamber 36. Heat can be directed either through a double walled tank and/or heater(s) 85 from toward the second end 88 to toward the first end 86 or through other flow paths so as to heat the pyrolysis chamber 22 to a desired temperature, such as from 200-1200 C or more preferably about 600 C for wood waste as educt 1. Other educt 1 may have other operational ranges. Exhaust gas 7 can escape the heating chamber 36 through a stack 102 or other system. Heater(s) 85 could take a variety of configurations in various embodiments, if utilized.

Steam cracking unit 26 preferably operates at least 200 C higher than temperature at the conveyor or auger 38. For the illustrated embodiment, temperature can be closer to 1200 C, which can often be maintained by the partial combustion reaction occurring in the steam cracking unit as described above, but certainly could be assisted using fuel 96, at least initially.

Figure 4:
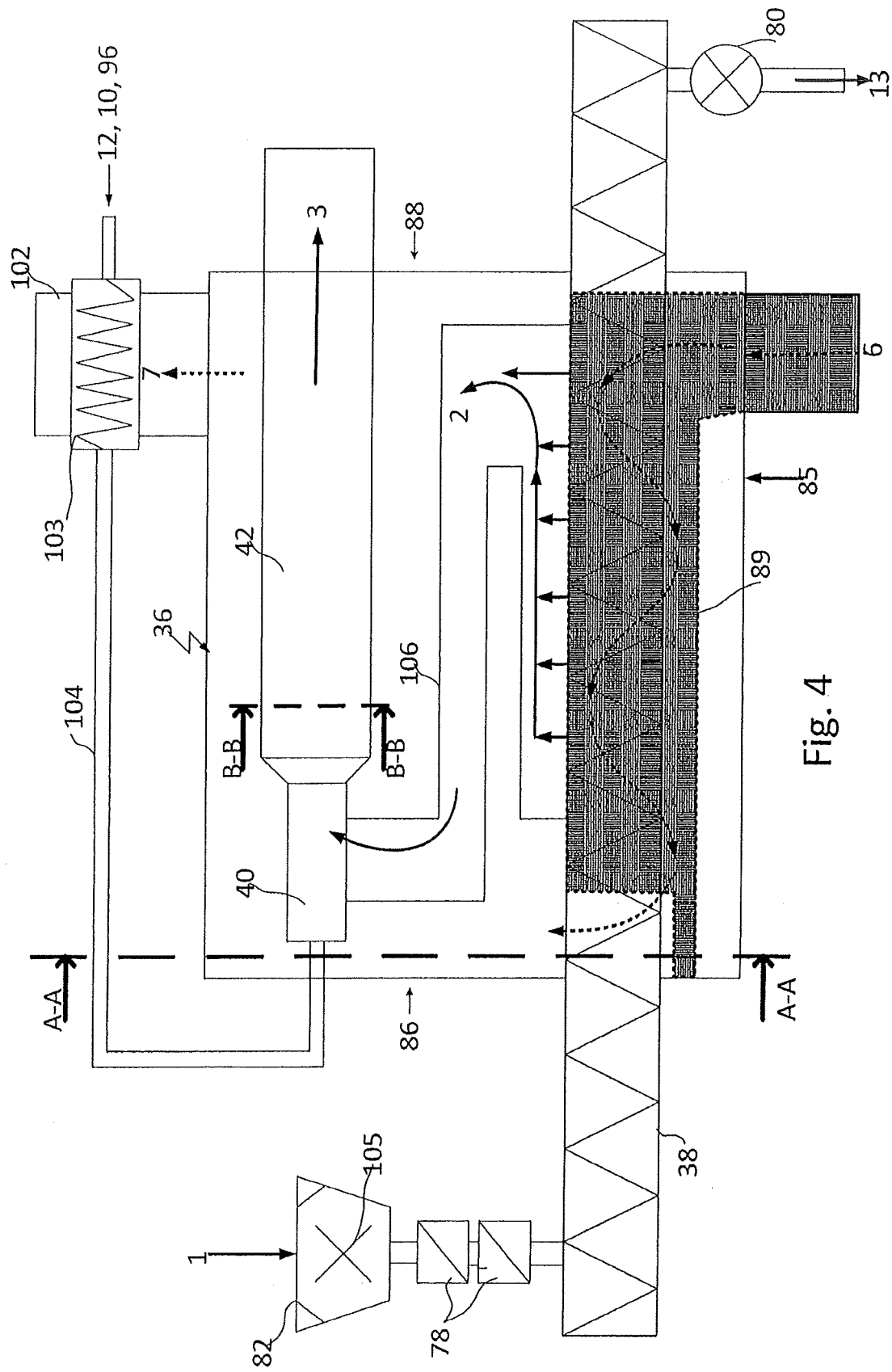
FIG. 4 is a schematic view showing internal portions of a heating chamber shown in FIGS. 1-3.

FIG. 4 shows a detail of the heating chamber 36 as shown in FIG. 3. The pyrolysis unit 22 has the auger reactor 38 which directs gas/vapor mixture 2 through header or ductwork 106 towards the steam cracking unit 42, such as through an ejector 40 where the gas/vapor mixture 2 can combine with oxygen and/or air and/or steam as input 104 to the ejector which can assist in pulling the gas/vapor mixture 2 into the steam cracking unit 42 for cracking as described above or otherwise.

FIG. 5 shows cross section A-A of FIG. 4 showing double augers 108,110 directing educt 1 from inlet where it may be initially ground with grinder 105 shown in FIG. 4. As the pyrolysis process occurs, the gas/vapor mixture 2 is directed through ductwork 106 into steam cracking unit 26 such as at the ejector 40 to then be directed to the mixing tube 42. Flow rates can be monitored with a processor which can at least assist in controlling the speed of the augers 108,110 or other conveyor as well as the amount of heat input at inlet 112 or flow from the stack 102. Meanwhile the processor can also control flow of air, oxygen, steam and/or fuel as input 104 into the steam cracking unit 26 such as by using any of the appropriate valves 90,92,94 or other means. The feed rate through the inlet 82 could also be controlled. Additionally, the oxygen/air through valve 92 may be preheated, such as with fuel 96 or otherwise at preheater 103 before being directed as input 104 into the cracking unit 26 for at least some embodiments, such as into the ejector 40 or otherwise, such as at or above 200 C, above 500 C, or even above 1000 C. Cooled flue gas 7 may still have sufficient heat to act as a heating agent, such as to impart heat to preheater 103 for at least some embodiments.

Adjusting the heat input with flue gas 6 may involve the use of valves and/or the operation of the generator 34 and/or turbine 24 or other motor and/or burner 72.

FIG. 6 shows cross section B-B of FIG. 5 with a mixing tube 42 in the form of a pipe 114 and a ceramic liner 116. The ceramic liner 116 is shown internally disposed to the pipe 114. Other embodiments may be constructed differently. The ceramic liner 116 may be useful to assist in maintaining the cracking unit 26 and/or mixing tube 42 at a higher temperature than the temperature at the conveyor, such as along an auger 108,110, or in the housing 111. Ceramic liners 116 may be selected to be resistant to degradation in the harsh environment. To avoid or at least discourage CO disintegration of the ceramics forming the ceramic liner 116 or other ceramic portions, pure ceramics without Fe2O3 impurities may be selected. Presently preferred ceramic liners 116 can be made from Al2O3, Silicon Carbide, SiO2, and/or Fire Clay with very low iron contents, such as lower than about 0.1%.

For many embodiments, an improved syngas generation system or plant 20 comprises a heater or heating chamber 36 providing a pyrolysis chamber or unit 22, said heater receiving heat from an inlet 112, a conveyor, such as one or more augers 108,110, within the heater directing input from towards a second end 88 to towards a first end 86. In fact, for the preferred embodiment the input or educt 1 is directed through the first and second ends 86,88 respectively. Airlocks 78 and 80 are useful to maintain pressure below atmospheric pressure in the housing 111 of the pyrolysis unit 22 for at least some embodiments.

An outlet directs spent input or char 13 from the heater or heating chamber 36. Char 13 need not necessarily be completely spent, and some embodiments may recycle char 13 back through as educt 1 for at least some embodiments. Spent input for this specification means educt 1 that has been processed through the pyrolysis unit 22 at least once.

An ejector 40 receives a gas/vapor mixture 2 from a pyrolysis reaction in the pyrolysis unit 22. The ejector 40 directs the gas/vapor mixture 2 into a cracking unit or mixing tube 42 at least partially located within the heating chamber 36. The cracking unit 42 operates at a temperature in excess of 1000 degrees Celcius, such as about 1200 C. The cracking unit 42 is also at a temperature at least 200 C higher than the conveyor illustrated as augers 108,110 which may be a double auger. The cracking unit 26 receives at least one of steam and oxygen (such as from air or other source) from external to the heater or heating chamber 36 such as at inlet 104 to assist in forming Syngas 3 directed out of the heating chamber 36 for additional processing, such as cooling, compressing, storing, and/or burning (such as combustion) to provide one of heat and electricity through a generator 34.

One advantage of having the cracking unit 26 in the heating chamber 36 with the pyrolysis unit 22 is that potentially condensable tars or soot is inhibited since there are no cold surfaces in the heating chamber 36 until the cracking process is completed. Baffle 89 and/or baffle plates in the heating chamber 36 may be useful to direct heat, such as from the flue gas 6 and/or other heat sources.

The pyrolysis reaction in the pyrolysis unit 22 normally occurs at a vacuum pressure (i.e., less than 14.7 psia, i.e., atmospheric pressure). The pressure in the pyrolysis unit 22 will thus be less than a pressure in the mixing tube 42 of the cracking unit 26.

In order to reduce a likelihood of particulate entering the cracking unit 26, baffles and/or relatively low flow rates in the ductwork 106 can be employed, such as less than about 1 meter per second.

The conveyor can provide at least one auger 108,110 internal to a housing 111. The housing 111 may be connected by a manifold having ductwork 106 to the steam cracking unit 26, such as to the ejector 40. Heat, such as from flue gas 6 or other source can flow about the housing 111 externally as well as the manifold, for example the ductwork 106, and/or the cracking unit 106 to an exhaust or stack 102.

The conveyor may direct educt 1 from the inlet 82 to the outlet 84 as char 13 out of the heater or heating chamber 36 proximate to the first end 88 of the heater.

In order to provide a relatively continuous process, once operating during normal operation, at least some of the syngas 3, such as after being cooled as cooled syngas 4 and/or compressed syngas 5 and/or other syngas is utilized to power a generator 34 as part of a continuous process. Waste heat, such as from flue gas 6 from combustion of the syngas 5 can be utilized to provide at least some of the heat, if not all of the heat for the heating chamber 36 and/or the pyrolysis unit 22 during normal operation.

Figure 8:
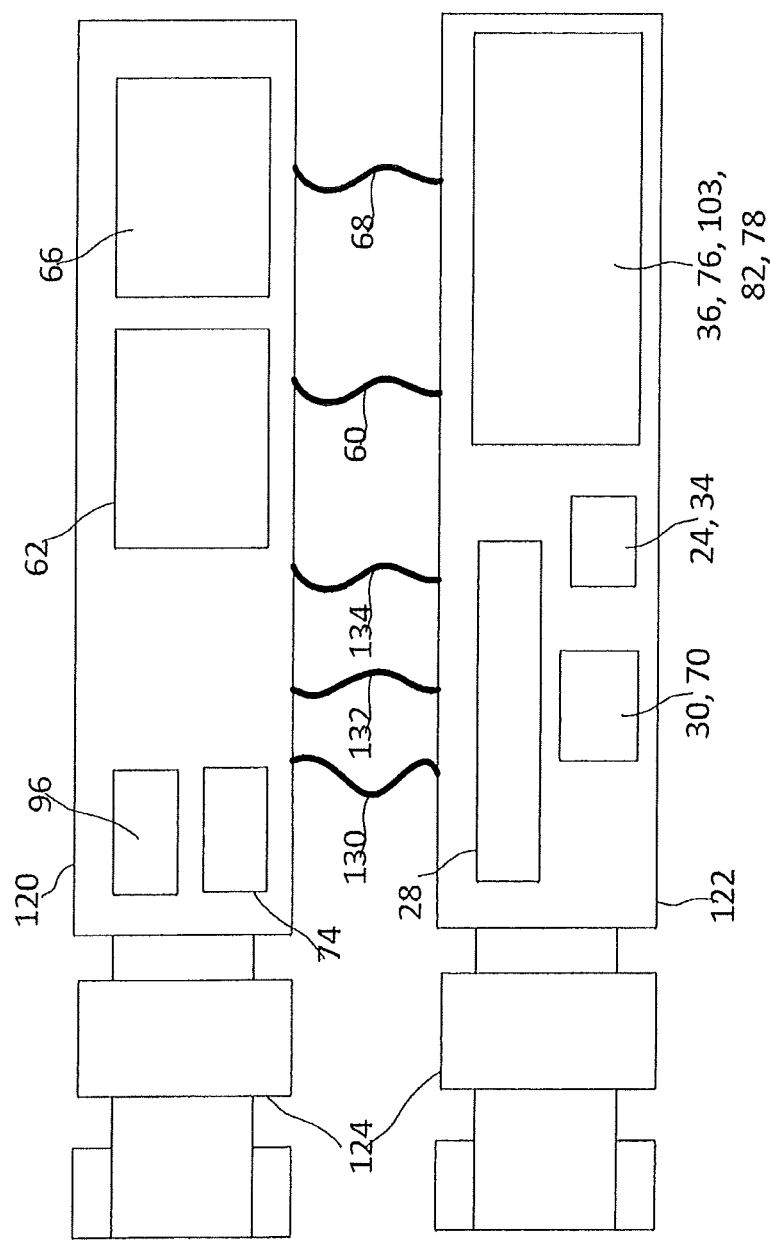
FIG. 8 is top plan view of the embodiment of FIG. 1 as could be provided on tractor trailers.

The plant 20 can be provided on one or more movable platforms as shown in FIG. 8 or otherwise, such as trailers 120,122 which could be relatively quickly provided on location with a tractor trailer 124. Other movable platforms could certainly be useful as well. For natural disasters or other events or puroses, the plant 20 could be set up on or near location to process educt 1 while generating electricity with generator 34, burning syngas and/or storing fuel for future use.

One trailer 120 or 122 could contain the utilities to sustain the process. The other trailer 120 or 122 could contain the heating chamber 36 and the generator 34 and associated components. Interconnection could be performed with hoses 130,132,134 or other connectors. Two thousand pounds per hour could be processed with such a plant 20 relatively easily.

Some embodiments may have enough moisture content in the educt 1 to not need to add steam 10 to the cracking unit 26, others may need to add the steam 10. Adding air and/or oxygen as input 104 or otherwise to the cracking unit 26 can increase the temperature of the partial combustion and steam cracking process.

In addition to educt 1 being organic material such as wood waste, other educt 1 could be waste tires, plastics, etc, but a mechanism to filter out sulfur and/or other undesirable component such as halogens, etc., could be incorporated into at least some of the processes. Other educt 1 may benefit by additional filer means of the syngas 3.

Figure 7:
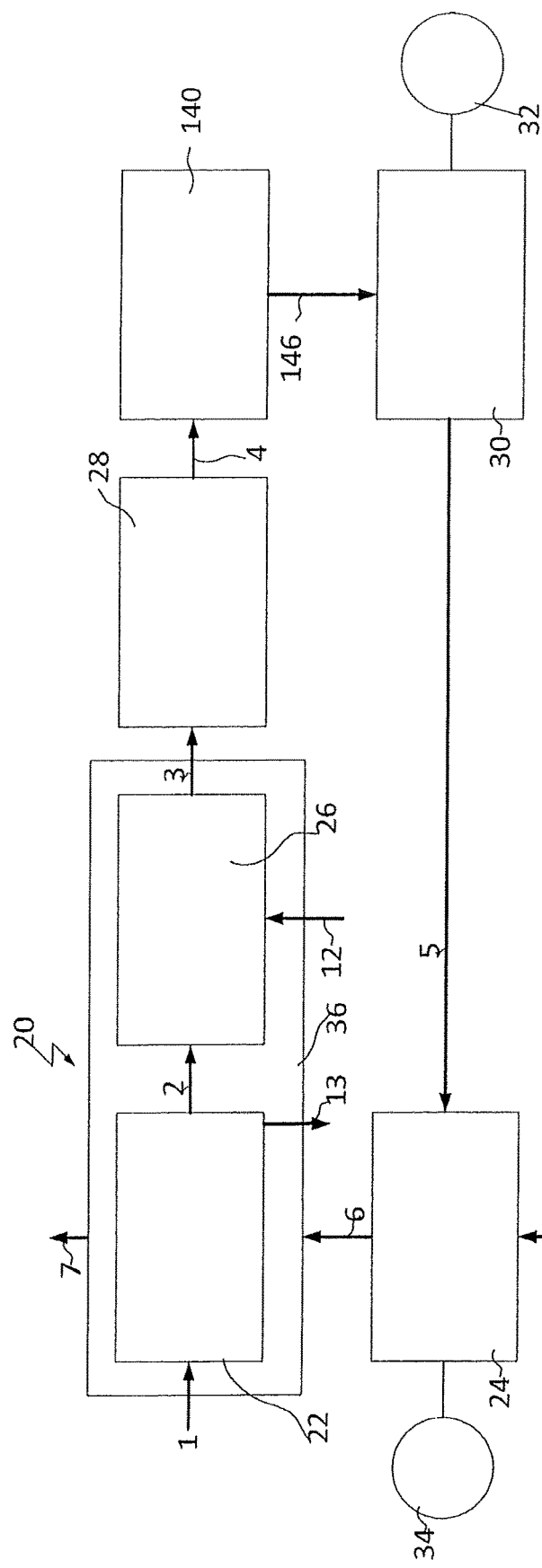
FIG. 7 is a schematic view of a first alternatively preferred embodiment of the present invention.
Figure 9:
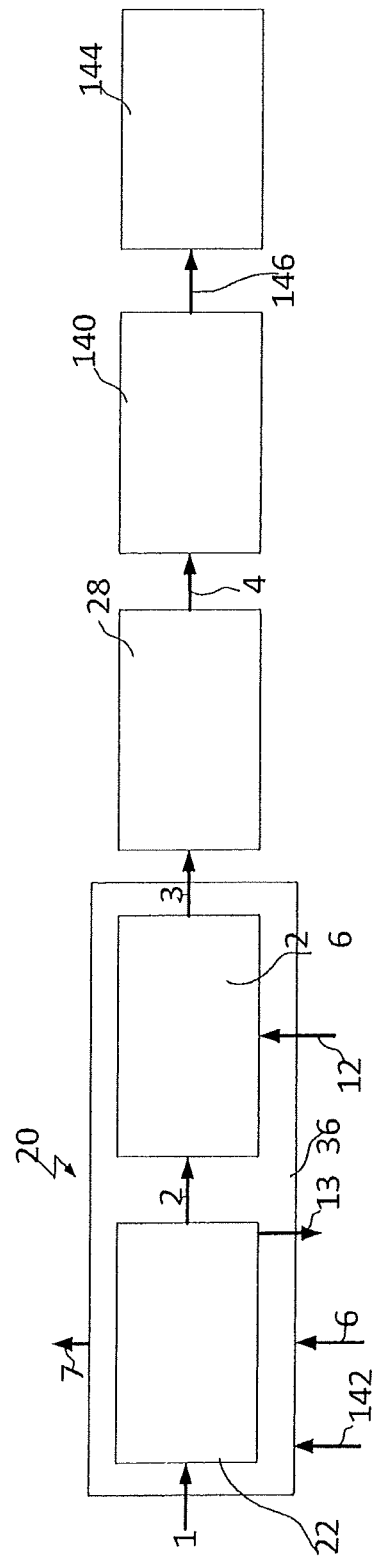
FIG. 9 is a schematic view of a second alternatively preferred embodiment of the present invention.

FIGS. 7 and 9 show alternatively preferred embodiments of a plant 20 having a scrubber 140 to remove sulfur or other undesirable component such as halogens, etc. from the cooled syngas 4 to provide scrubbed syngas 146 to a biodiesel synthesis plant 144 or other location downstream. An optional external heat source 142 shown in FIG. 9 is also illustrated for some embodiments. Such a heat source 142 may be from various sources, such as, but not limited to waste flue gas from another source to possibly provide some plants 20 as a syngas generator which need not necessarily send syngas 5 to be burned in a motor 24 to then offgas flue gases 6 to run a loop cycle. Other embodiments may be more loop oriented. Scrubbers 140 could be installed instead of, or after the cooler 28 for various embodiments.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. An improved syngas generation system comprising: a heater providing a pyrolysis chamber, said heater receiving heat from an inlet, a conveyor within the heater, wherein the pyrolysis chamber comprises a housing extending about the conveyor, and the conveyor directing input from towards a second end to towards a first end of the heater, an outlet directing spent input from the pyrolysis chamber, an ejector receiving gas/vapor mixture from a pyrolysis reaction of the input occurring in the housing and directing the gas/vapor mixture into a cracking unit, which cracking unit is at least partially located within the heater, said cracking unit operating at a temperature in excess of 1000 degrees Celsius and at least 200 degrees Celsius higher than temperature at the conveyor, said cracking unit receiving steam and oxygen from external to the heater to assist in forming syngas; and an output external of the heater receiving the syngas.

2. The improved syngas generation system of claim 1, wherein the conveyor comprises at least an auger in the housing, said housing connected by a manifold to the ejector, whereby the heat is directed externally about the housing, manifold and cracking unit from an input to an exhaust.

3. The improved syngas generation system of claim 2, wherein the conveyor comprises a double auger.

4. The improved syngas generation system of claim 2 wherein particulate in the gas/vapor mixture is reduced when provided to the cracking unit by limiting the flow rate to less than 1 meter per second to the cracking unit.

5. The improved syngas generation system of claim 1, wherein the spent input further comprises char and the conveyor dispenses the char out of the heater proximate to the first end of the heater.

6. The improved syngas generation system of claim 1, further comprising an air input and wherein the oxygen is received from the air input directed into the cracking unit with the air directed through the ejector into the cracking unit.

7. The improved syngas generation system of claim 1, further comprising a generator and wherein at least some of the syngas powers the generator to make electricity as a part of a continuous process during normal operation.

8. The improved syngas generation system of claim 7, wherein waste heat from a combustion process provides the heat to the heater during normal operation.

9. The improved syngas generation system of claim 1, wherein at least some of the syngas is burned to provide all of the heat to the heater during normal operation.

10. The improved gas generation system of claim 1, wherein the cracking unit has a ceramic liner which assists in maintaining the cracking unit at a higher temperature than the temperature at the conveyor.

11. An improved syngas generation system comprising: a heater providing a pyrolysis unit, said heater having heat directed into the heater from an inlet, wherein the pyrolysis unit comprises a conveyor located in a housing directing input from towards the second end to towards the first end of the heater where an outlet of the pyrolysis unit directs spent input from the pyrolysis unit, a cracking unit receiving gas/vapor mixture generated from a pyrolysis reaction of the input along the conveyor and in the housing of the pyrolysis unit, said cracking unit at least partially located within the heater, said cracking unit operating at a temperature in excess of 1000 degrees Celcius, said cracking unit receiving steam from external to the heater to assist in forming syngas with partial combustion occurring in the cracking unit; said pyrolysis unit operating at a pressure less than the cracking unit within the heater; and an output external of the heater receiving the syngas.

12. The improved syngas generation system of claim 11, wherein the pyrolysis unit is operated at a vacuum relative to atmospheric pressure.

13. The improved syngas generation system of claim 12, further comprising airlocks at an inlet receiving the input and at the outlet.

14. The improved syngas generation system of claim 11, wherein the oxygen is preheated prior to exceed 1000° C. prior to providing to the ejector utilizing at least partially heat recovered from a cooler cooling the syngas after leaving the cracking unit.

15. The improved syngas generation system of claim 11, wherein the heat is directed from towards a first end of the heater to towards a second end of the heater about the pyrolysis unit.

16. The improved syngas generation system of claim 11, wherein the conveyor comprises at least an auger in the housing, said housing connected by a manifold to an ejector, said ejector providing gas/vapor mixture to the cracking unit, whereby the heat is directed externally about the housing, manifold and cracking unit from an input to an exhaust.

17. The improved syngas generation system of claim 11, wherein oxygen is directed into the cracking unit from external to the heater.

18. The improved syngas generation system of claim 17, wherein air is directed through an ejector into the cracking unit thereby providing the oxygen, said ejector receiving gas/vapor mixture from the pyrolysis unit and directing to the cracking unit with the air.

19. The improved syngas generation system of claim 18 wherein the steam is directed through the ejector into the cracking unit.

20. The improved syngas generation system of claim 11, further comprising a cooler downstream of the cracking unit, said cooler cooling syngas to a temperature less than 900° C. within five seconds of the syngas leaving the cracking unit.

* * * * *